United States Patent
Yoo et al.

(10) Patent No.: US 10,933,836 B2
(45) Date of Patent: Mar. 2, 2021

(54) SAFETY DEVICE FOR VEHICLE

(71) Applicants: Hyundai Motor Company, Seoul (KR); KIA Motors Corporation, Seoul (KR)

(72) Inventors: Joo Seon Yoo, Incheon (KR); Hyo Shub Shin, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 83 days.

(21) Appl. No.: 16/380,397

(22) Filed: Apr. 10, 2019

(65) Prior Publication Data
US 2020/0189514 A1    Jun. 18, 2020

(30) Foreign Application Priority Data

Dec. 12, 2018   (KR) ......................... 10-2018-0159787

(51) Int. Cl.
*B60R 21/231*   (2011.01)
*B60N 2/75*   (2018.01)
(Continued)

(52) U.S. Cl.
CPC .......... *B60R 21/23138* (2013.01); *B60N 2/79* (2018.02); *B60R 21/207* (2013.01);
(Continued)

(58) Field of Classification Search
CPC ............ B60R 21/207; B60R 21/23138; B60R 2021/23146; B60N 2/79
See application file for complete search history.

(56) References Cited

U.S. PATENT DOCUMENTS

2006/0202450 A1* 9/2006 Madasamy ....... B60R 21/23138
280/729
2018/0281723 A1* 10/2018 Nagasawa ............. B60R 21/207
(Continued)

FOREIGN PATENT DOCUMENTS

JP    2005125944 A    5/2005
JP    2018171991 A    11/2018
(Continued)

OTHER PUBLICATIONS

Extended European Search Report for EP 19169242.5-1132 dated Jul. 8, 2019 (9 pages).

*Primary Examiner* — James A English
(74) *Attorney, Agent, or Firm* — Brinks Gilson & Lione

(57) ABSTRACT

A safety device for a vehicle, which includes a main armrest, an auxiliary armrest that obliquely extends from a front end portion of the main armrest toward the center of a seat, a first airbag chamber that is accommodated in the main armrest and that, when triggered to expand, expands upward along a lateral body of a vehicle occupant and thus laterally holds an arm of the vehicle occupant in place, a second airbag chamber that extends protrusively from an upper end portion of the first airbag chamber toward a neck of the vehicle occupant and thus holds a shoulder of the vehicle occupant in place, and a front-body abdominal chamber that is mounted in the auxiliary armrest and that, when triggered to expand, expands toward an abdomen of the vehicle occupant and thus holds a front body of the vehicle occupant in place.

14 Claims, 8 Drawing Sheets

(51) Int. Cl.
*B60R 21/207* (2006.01)
*B60R 21/2338* (2011.01)
*B60R 21/01* (2006.01)
*B60R 21/216* (2011.01)

(52) U.S. Cl.
CPC . *B60R 21/2338* (2013.01); *B60R 2021/01211* (2013.01); *B60R 2021/2161* (2013.01); *B60R 2021/23146* (2013.01)

(56) References Cited

U.S. PATENT DOCUMENTS

| | | | |
|---|---|---|---|
| 2018/0281730 A1* | 10/2018 | Nagasawa | B60R 21/0134 |
| 2018/0326938 A1* | 11/2018 | Rickenbach | B60R 21/233 |
| 2019/0061676 A1* | 2/2019 | Kwon | B60R 21/233 |
| 2019/0106077 A1* | 4/2019 | Dry | B60R 21/215 |
| 2019/0118755 A1* | 4/2019 | Dry | B60N 2/79 |
| 2019/0152421 A1* | 5/2019 | Byun | B60R 21/207 |

FOREIGN PATENT DOCUMENTS

| | | | | |
|---|---|---|---|---|
| JP | 2018171992 A | 11/2018 | | |
| JP | 2018171993 A | 11/2018 | | |
| JP | 2018171999 A | 11/2018 | | |
| JP | 2018172000 A | 11/2018 | | |
| JP | 2018172005 A | 11/2018 | | |
| KR | 101233336 | 2/2013 | | |
| WO | WO-2018021887 A1 * | 2/2018 | | B60R 21/00 |

* cited by examiner

SAFETY DEVICE FOR VEHICLE

CROSS REFERENCE TO RELATED APPLICATION

The present application claims priority to Korean Patent Application No. 10-2018-0159787, filed Dec. 12, 2018, the entire contents of which is incorporated herein by reference.

FIELD

The present disclosure relates to a safety device for a vehicle, in which, when a vehicle has a collision, an airbag cushion inflates from an armrest to absorb physical shock, thereby protecting a vehicle occupant.

BACKGROUND

Many airbags in the vehicle safety field are to guard against a head-on collision or a rear-side collision. When a vehicle has a collision, these airbags, which are installed in front of a vehicle occupant, expand in front of the vehicle occupant and thus perform a role in alleviating physical shock. In addition, there are many airbags to guard against a side collision, such as a side airbag, a roof airbag, and a curtain airbag.

On the other hand, we have discovered that there is a high likelihood that a function of rotating a seat will be performed when a future autonomous traveling vehicle travels in an autonomous traveling mode. In the autonomous traveling mode, seats such as a driver seat and a passenger seat can rotate in order that a driver faces in the backward direction or that the driver and a passenger face each other.

However, in a case where the seat rotates, the vehicle occupant faces in a direction that is different from the direction in which the vehicle travels. Because of this, existing airbags mounted in a steering wheel or a crash pad can be difficult to utilize.

Therefore, in a safety device for a vehicle, it may be desired that an airbag cushion expand from an armrest to protect the vehicle occupant against all collisions in the forward direction and the horizontal direction.

The foregoing is intended merely to aid in the understanding of the background of the present disclosure, and is not intended to mean that the present disclosure falls within the purview of the related art that is already known to those skilled in the art.

SUMMARY

The present disclosure provides a safety device for a vehicle in which, when a vehicle has a collision, an airbag cushion expands from an armrest and physical shock is sufficiently absorbed to protect a vehicle occupant who sits on a seat.

According to one aspect of the present disclosure, there is provided a safety device for a vehicle, the device including: a main armrest; an auxiliary armrest that obliquely extends from a front end portion of the main armrest toward the center of a seat; a lateral-body chamber that is mounted in the main armrest and that, when triggered to expand, expands upward along a lateral body of a vehicle occupant and thus laterally holds the lateral body of the vehicle occupant in place; and a front-body abdominal chamber that is mounted in the auxiliary armrest and that, when triggered to expand, expands toward an abdomen of the vehicle occupant and thus holds a front body of the vehicle occupant in place.

In the safety device for a vehicle, the lateral-body chamber may be configured to include a first airbag chamber that is mounted in the main armrest and that, when triggered to expand, expands upward along the lateral body of the vehicle occupant and thus laterally holds an arm of the vehicle occupant in place, and a second airbag chamber that extends protrusively from an upper end portion of the first airbag chamber toward a neck of the vehicle occupant and thus holds a shoulder of the vehicle occupant in place.

In the safety device for a vehicle, the first airbag chamber and the second airbag chamber may be spatially separated from each other by an inner panel that traverses the inside of one airbag chamber, a through-hole through which gas flows between the first airbag chamber and the second airbag chamber may be formed in the inner panel, and the first airbag chamber may be supplied with gas from an inflator of the main armrest and thus may swell and the second airbag chamber may be supplied with gas from the first airbag chamber through the through-hole and thus may swell.

The safety device for a vehicle may further include an obliquely-positioned tether one end of which is coupled to an outside surface that faces the vehicle occupant, of the first airbag chamber and the other end of which is coupled to an outside surface that faces the vehicle occupant, of the second airbag chamber, in which, when the expansion is in progress, the obliquely-positioned tether may enable the second airbag chamber to maintain a state of expanding protrusively from the first airbag chamber.

The safety device for a vehicle may further include a holding tether, one end of which is coupled to a rear end portion of the first airbag chamber and the other end of which is coupled to a lateral side of a seat back, in which, when the expansion is in progress, the holding tether may prevent or inhibit the first airbag chamber from moving in a forward direction.

In the safety device for a vehicle, a holding tether cutter may be provided on the holding tether, and, in a case where a reclining angle of the seat back falls within a fixed range, when the first airbag chamber expands, the holding tether cutter may cut off the holding tether.

In the safety device for a vehicle, the holding tether cutter may be provided on the main armrest and may be coupled to the other end of the holding tether.

In the safety device for a vehicle, one end of the holding tether may be coupled to a rear end portion of the first airbag chamber and the other end may extend along a lateral side of the back seat and then may be coupled to the main armrest.

The safety device for a vehicle may further include a fourth airbag chamber that extends protrusively from a part of a front portion of the first airbag chamber, which is positioned below the second airbag chamber, toward a chest region of the vehicle occupant, in which the fourth airbag chamber may be positioned between a lower end of the second airbag chamber and an upper end of the front-body abdominal chamber and may prevent or inhibit the arm or shoulder of the vehicle occupant from moving in the forward direction.

The safety device for a vehicle may further include a fifth airbag chamber that extends from a rear portion of the front-side abdominal chamber toward the pelvic region of the vehicle occupant in which the fifth airbag chamber may expand between the main armrest and a pelvic region of the vehicle occupant.

The safety device for a vehicle may further include a chamber that extends upward from an upper surface portion of the front-body abdominal chamber and holds the front body of the vehicle occupant in place.

In the safety device for a vehicle, sixth airbag chambers in a pair may be provided on the left and right sides, respectively, of the seat, and the sixth airbag chamber that is provided on one of the left and right sides may extend upward to have an area that is larger than that of the sixth airbag chamber that is provided on the other one.

In the safety device for a vehicle, when triggered to expand, the sixth airbag chamber that is provided on one of the left and right sides may be positioned closer to the vehicle occupant than the sixth airbag chamber that is provided on the other one, and, in a state where the expansion is completed, a front surface portion of the sixth airbag chamber that is provided on one of the left and right sides may be supported by the sixth airbag chamber that is provided on the other one.

In the safety device for a vehicle, the auxiliary armrest may be coupled, with a rotation shaft, to the front end portion of the main armrest, and, when an airbag expands, the auxiliary armrest may rotate from the front end portion of the main armrest toward the center of the seat.

In the safety device for a vehicle, the auxiliary armrest may be accommodated into the main armrest, and, when the airbag expands, may be slit to protrude in the same direction in which the main armrest faces forward.

In the safety device for a vehicle, the auxiliary armrest, when slid to protrude, may be guided by a guide within the main armrest and thus may protrude obliquely toward the center of the seat.

In the safety device for a vehicle according to the present disclosure, when a vehicle has a collision, an airbag cushion expands from an armrest and physical shock is sufficiently absorbed to protect a vehicle occupant who sits on a seat.

Particularly, physical shock due to a vehicle's head-on collision or side collision is absorbed and thus that the vehicle occupant is protected against all collisions in the forward direction and the leftward-rightward direction.

DRAWINGS

The present disclosure will be more clearly understood from the following detailed description when taken in conjunction with the accompanying drawings, in which.

DETAILED DESCRIPTION

Specific features and advantages of the present disclosure will be more clearly understood from the following detailed description when taken in conjunction with the accompanying drawings. In case functions related to the present disclosure and specific description for the configuration unnecessarily obscure the gist of the present disclosure, it is noticed that the specific description will be omitted.

Figure 1:
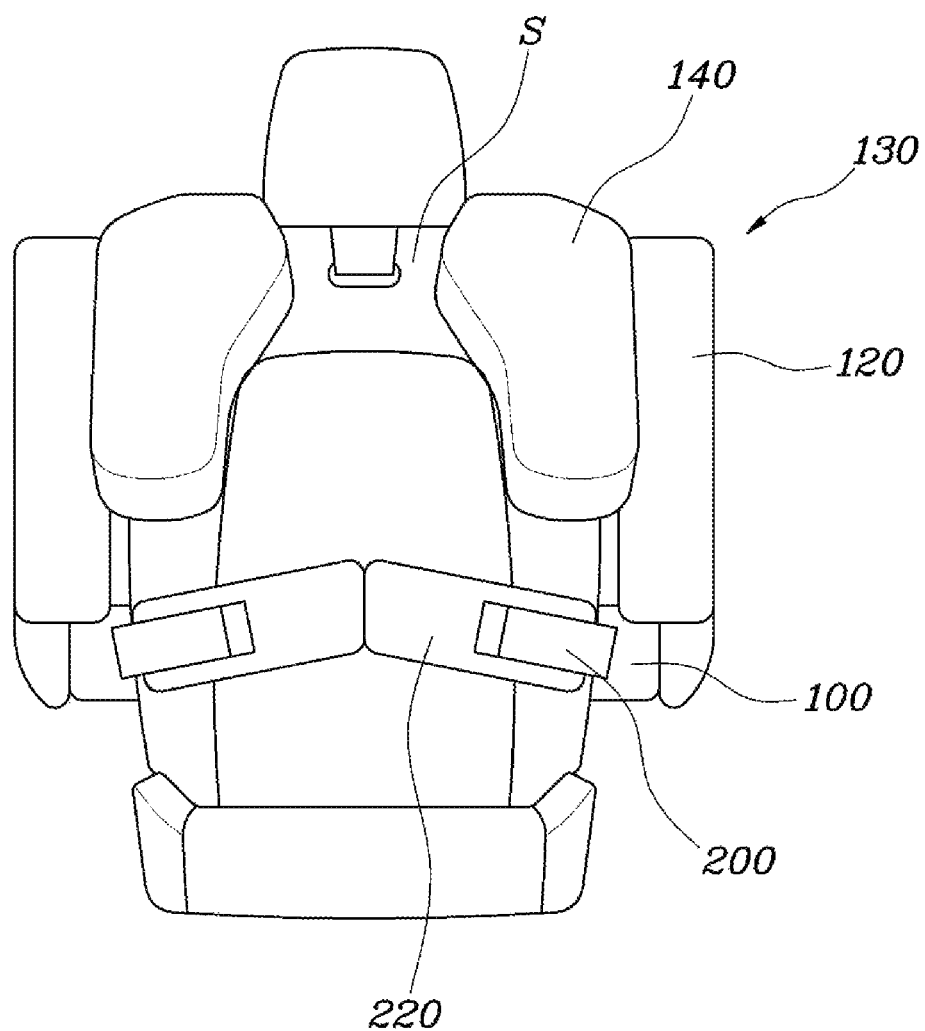
FIG. 1 is a front-view diagram illustrating a front side of a safety device for a vehicle according to an aspect of the present disclosure.
Figure 2:
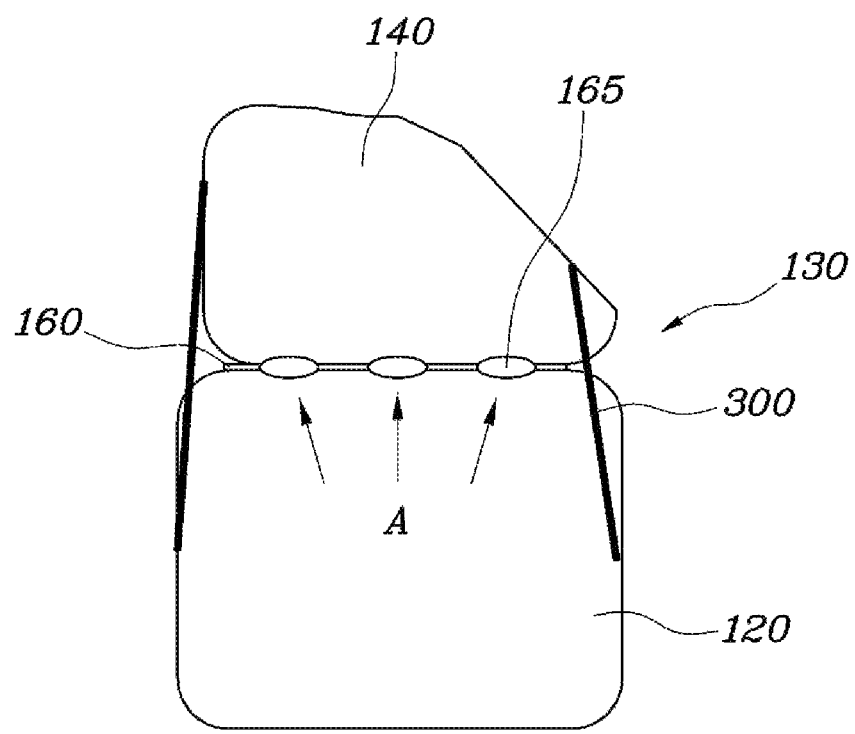
FIG. 2 is a diagram illustrating an inner panel and a through-hole in the safety device for a vehicle according to the aspect of the present disclosure.
Figure 3:
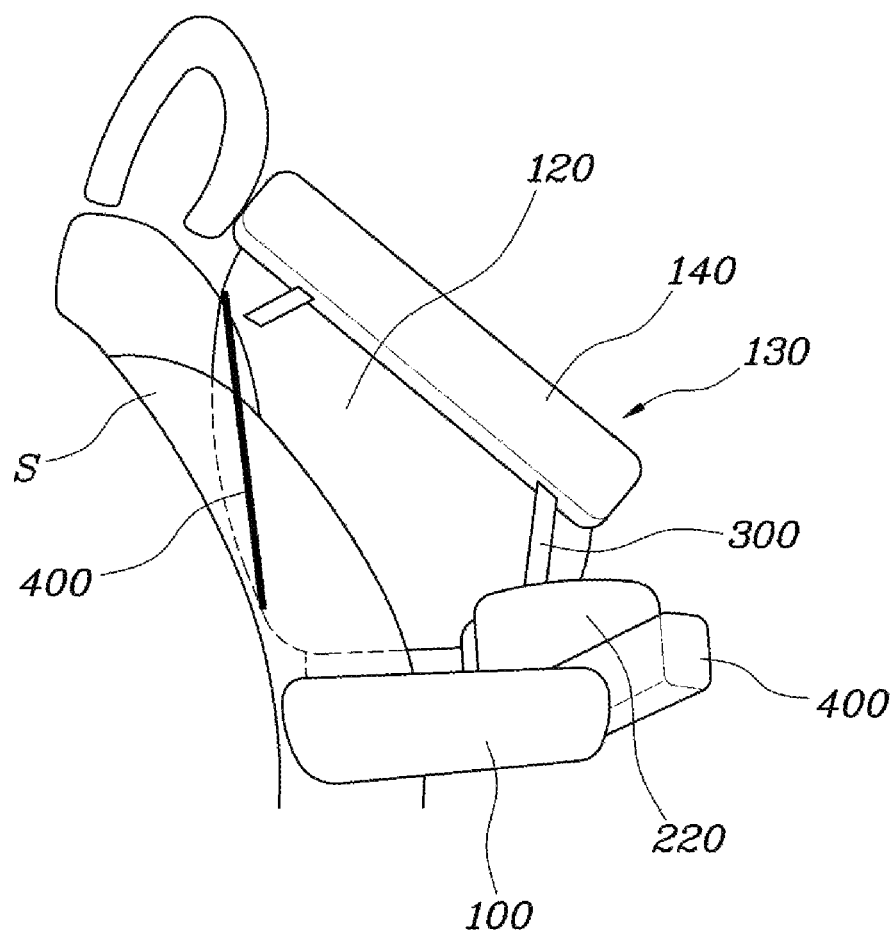
FIG. 3 is a side-view diagram illustrating a left lateral side of the safety device for a vehicle according to the aspect of the present disclosure.
Figure 4:
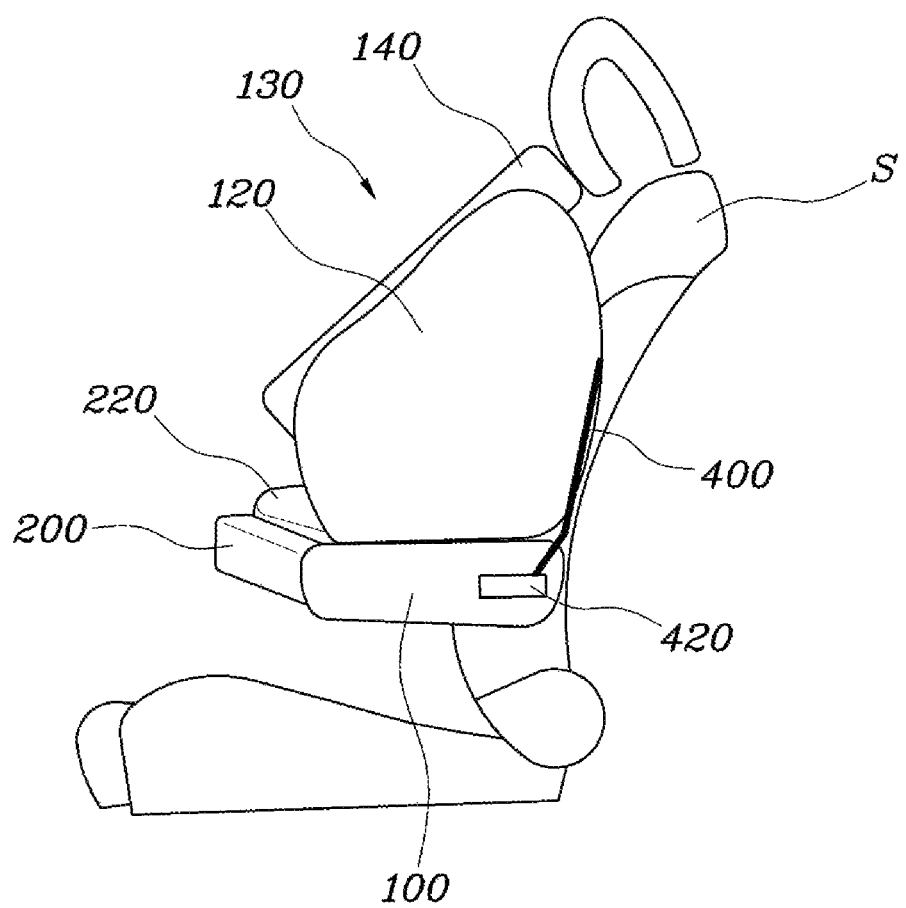
FIG. 4 is a diagram illustrating a side-view diagram illustrating a right lateral side of the safety device for a vehicle according to the aspect of the present disclosure.
Figure 5:
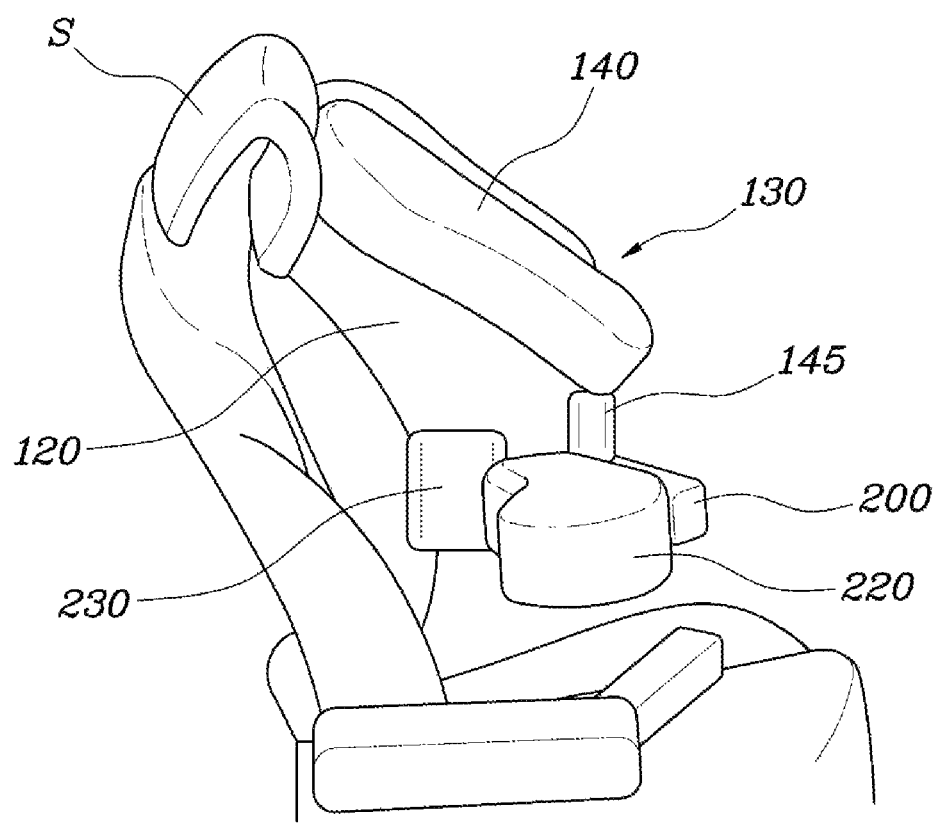
FIG. 5 is a perspective-view diagram illustrating a safety device for a vehicle according to another aspect of the present disclosure.
Figure 6:
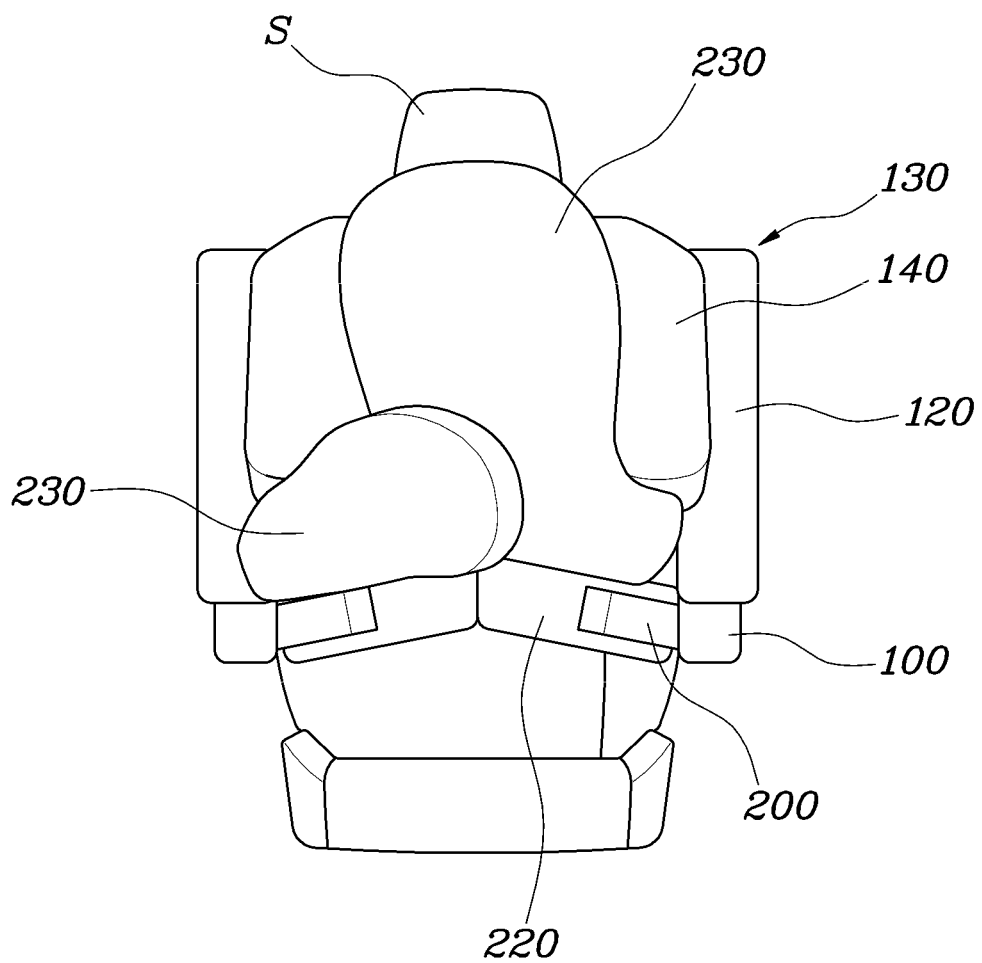
FIG. 6 is a front-view diagram illustrating a safety device for a vehicle according to still another aspect of the present disclosure.
Figure 7:
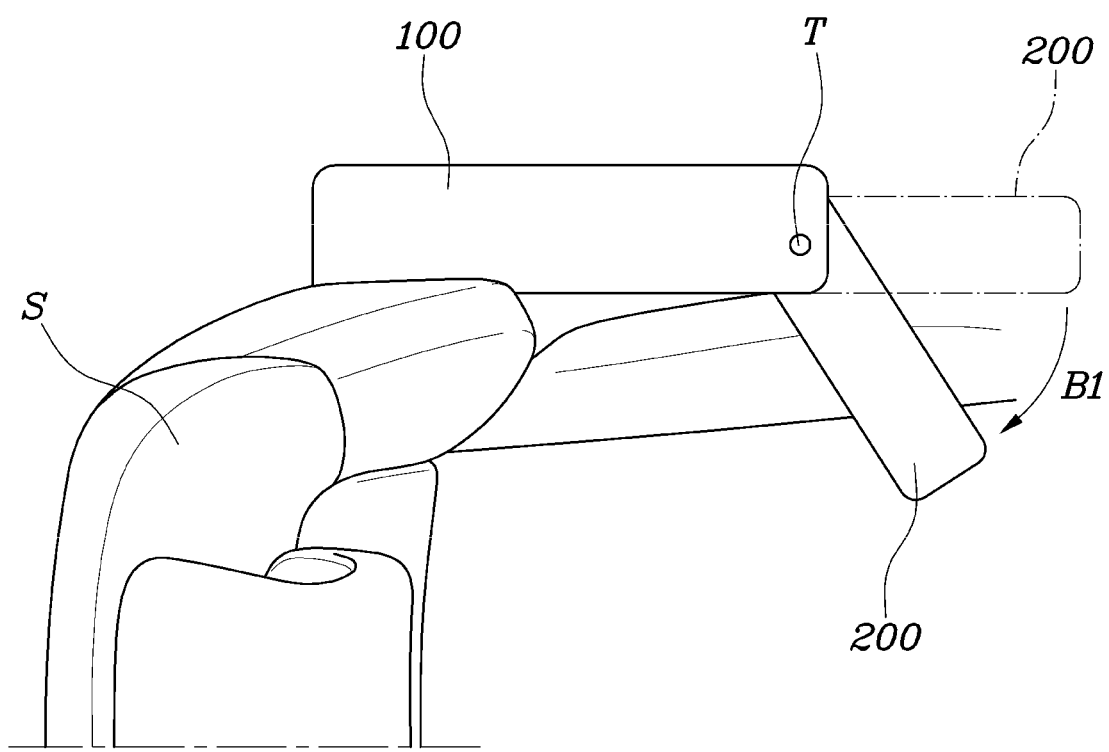
FIG. 7 is a diagram illustrating a state where an auxiliary armrest of a safety device for a vehicle according to still another aspect of the present disclosure is rotated.
Figure 8:
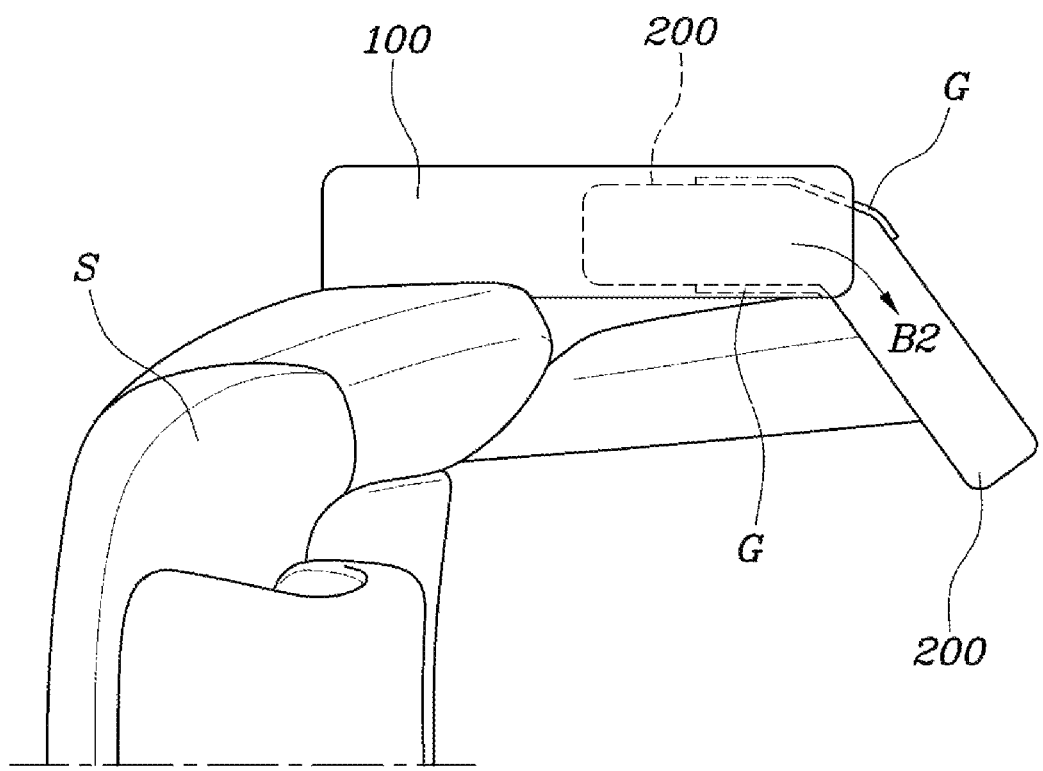
FIG. 8 is a diagram illustrating a state where an auxiliary armrest of a safety device for a vehicle according to still another aspect of the present disclosure expands.

FIG. 1 is a front-view diagram illustrating a front side of a safety device for a vehicle according to an aspect of the present disclosure. FIG. 2 is a diagram illustrating an inner panel and a through-hole in the safety device for a vehicle according to the aspect of the present disclosure. FIG. 3 is a side-view diagram illustrating a left lateral side of the safety device for a vehicle according to the aspect of the present disclosure. FIG. 4 is a diagram illustrating a side-view diagram illustrating a right lateral side of the safety device for a vehicle according to the aspect of the present disclosure. FIG. 5 is a perspective-view diagram illustrating a safety device for a vehicle according to another aspect of the present disclosure. FIG. 6 is a front-view diagram illustrating a safety device for a vehicle according to still another aspect of the present disclosure. FIG. 7 is a diagram illustrating a state where an auxiliary armrest of a safety device for a vehicle according to still another aspect of the present disclosure is rotated. FIG. 8 is a diagram illustrating a state where an auxiliary armrest of a safety device for a vehicle according to still another aspect of the present disclosure expands.

FIG. 1 is a front-view diagram of a safety device for a vehicle. A safety device for a vehicle according to the present disclosure includes a main armrest 100, an auxiliary armrest 200 that obliquely extends from a front end portion of the main armrest 100 toward the center of a seat, a lateral-body chamber 130 that is mounted in the main armrest 100 and that, when triggered to expand, expands upward along a lateral body of a vehicle occupant and thus laterally holds the lateral body of the vehicle occupant in place, and a front-body abdominal chamber 220 that is mounted in the auxiliary armrest 200 and that, when triggered to expand, expands toward an abdomen of the vehicle occupant and thus holds a front body of the vehicle occupant in place.

The safety device for a vehicle according to the present disclosure includes the main armrest 100 and the auxiliary armrest 200. As illustrated in FIG. 1, the main armrest 100 is coupled to a lateral side of the seat. When a vehicle has a collision, the lateral-body chamber 130 expands upward along the lateral body of the vehicle occupant and thus performs a function of absorbing physical shock, which propagates from the leftward-rightward direction, to the vehicle occupant. In addition, the lateral-body chamber 130 performs not only the function of absorbing the physical shock in the horizontal direction to the lateral body of the vehicle occupant, but also performs a function of absorbing physical shock, which propagates from the forward direction, to a shoulder region of the vehicle occupant. Then, the front-body abdominal chamber 220 expands toward the abdomen of the vehicle occupant, and thus the auxiliary armrest 200 absorbs physical shock, which propagates from the forward direction, to the vehicle occupant and, at the same time, protects the abdomen of the vehicle occupant.

That is, airbag chambers absorb physical shock, which propagates from the leftward-rightward direction and the forward direction, to the vehicle occupant and a seat back S serves as a support stand in rear of the vehicle occupant. This serves to guard against the physical shock in all directions. More specifically, as illustrated in FIG. 1, the lateral-body chamber 130 according to the present disclosure is configured to include a first airbag chamber 120 that is mounted in the main armrest 100 and that, when triggered to expand, expands upward along the lateral body of the vehicle occupant and thus laterally holds an arm of the vehicle occupant in place, and a second airbag chamber 140 that extends protrusively from an upper end portion of the first airbag chamber 120 toward a neck of the vehicle occupant and thus holds a shoulder of the vehicle occupant in place. In this manner, the lateral-body chamber 130 is configured to include the first airbag chamber 120 and the second airbag chamber 140 that possibly extends from the first airbag chamber 120. With this configuration, when the airbag expands, the second airbag chamber 140 is enabled to extend protrusively in a suitable manner to hold the shoulder of the vehicle occupant in place. In addition, the first airbag chamber 120 and the second airbag chamber 140 hold the arm and the shoulder, respectively, of the vehicle occupant in place. This provides the advantage that the upper body of the vehicle occupant is tightly held in place.

On the other hand, as illustrated in FIGS. 1 and 2, the first airbag chamber 120 and the second airbag chamber 140 are spatially separated from each other by an inner panel 160 that traverses the inside of one airbag chamber. A through-hole 165 through which gas flows between the first airbag chamber 120 and the second airbag chamber 140 is formed in the inner panel 160. The first airbag chamber 120 is supplied with gas from an inflator of the main armrest 100 and thus swells. The second airbag chamber 140 is supplied with gas from the first airbag chamber 120 through the through-hole 165 and thus swells. If the first airbag chamber 120 and the second airbag chamber 140 expand at the same time, the second airbag chamber 140 comes into physical collision with the arm of the vehicle occupant. Thus, there is a likelihood that the airbag will not properly expand or that the risk of the vehicle occupant being hurt will take place due to the airbag. It may be desirable that the second airbag chamber 140 expands later than the first airbag chamber 120. As illustrated in FIG. 2, in the safety device for a vehicle according to the present disclosure, the inner panel 160 separates the first airbag chamber 120 and the second airbag chamber 140 from each other. Then, the through-hole 165 is formed in the inner panel 160. The second airbag chamber 140 expands due to the gas that flows through the through-hole 165 ("A" in FIG. 2). Accordingly, the second airbag chamber 140 expands at a later time than the first airbag chamber 120. Therefore, after the first airbag chamber 120 expands almost to maximum size, the second airbag chamber 140 starts to expand. Thus, the second airbag chamber 140 does not come into physical collision with the arm or shoulder of the vehicle occupant.

On the other hand, as illustrated in FIGS. 2 and 3, the safety device for a vehicle according to the present disclosure further includes an obliquely-positioned tether 300 one end of which is coupled to an outside surface that faces the vehicle occupant, of the first airbag chamber 120 and the other end of which is coupled to an outside surface that faces the vehicle occupant, of the second airbag chamber 140. When the expansion is in progress, the obliquely-positioned tether 300 enables the second airbag chamber 140 to maintain a state of expanding protrusively from the first airbag chamber 120. In this manner, the obliquely-positioned tether 300 connects between the first airbag chamber 120 and the second airbag chamber 140, thereby inhibiting the second airbag chamber 140 from expanding only in the upward direction. Therefore, the shoulder of the vehicle occupant is safely protected against the collision.

On the other hand, as illustrated in FIGS. 3 and 4, the safety device for a vehicle according to the present disclosure further includes a holding tether 400 one end of which is coupled to a rear end portion of the first airbag chamber 120 and the other end of which is coupled to a lateral side of the seat back S. When the expansion is in progress, the holding tether 400 prevents or inhibits the first airbag chamber 120 from moving in a forward direction. In a case where the vehicle makes a head-on collision, under the force of inertia, the vehicle occupant moves toward the direction in which the vehicle travels. In this case, the holding tether 400 is caused to be coupled to the rear end portion of the first airbag chamber 120 and the lateral side of the seat back S. Thus, the first airbag chamber 120 and the second airbag chamber 140 are supported so strongly that the vehicle occupant is prevented or inhibited from moving in the forward direction.

In addition, a holding tether cutter 420 is provided on the holding tether 400. In a case where a reclining angle of the seat back S falls within a fixed range, when the first airbag chamber 120 expands, the holding tether cutter 420 cuts the holding tether 400. At the initial stage of the vehicle collision, the holding tether cutter 420 provides support through the holding tether 400 in order for the vehicle occupant to move in the forward direction. After the initial stage of the vehicle collision, the holding tether 400 is cut off by the hold tether cutter 420 in order to reduce the force of inertia that is exerted on the vehicle occupant. Accordingly, the first airbag chamber 120 and the second airbag chamber 140 move toward the forward direction, and thus the force of inertial that is exerted on the vehicle occupant is distributed.

On the other, in a case where the seat back S is reclined at or above a fixed angle in order for a passenger to lie down, when the head-on collision takes place, a submarine phenomenon may occur where the lower body of the passenger is slid and where the shock-vulnerable abdomen of the passenger comes into physical collision with the front-body abdominal chamber 220. In a case where the reclining angle is above the fixed range, the holding tether 400 is set not to be cut off, in such a manner that the front-body abdominal chamber 220 and a pelvic region of the passenger face each other. This setting provides the advantage that the abdomen of the passenger is protected.

Specifically, as illustrated in FIG. 4, the holding tether cutter 420 is provided on the main armrest 100 and is coupled to the other end of the holding tether 400. This providing of the holding tether cutter 420 on the main armrest 100 does not require separate space, and thus provides the advantage that an exterior appearance is neat in terms of structure. In addition, as illustrated in FIG. 4, one end of the holding tether 400 is coupled to the rear end portion of the first airbag chamber 120 and the other end extends along the lateral side of the seat back S and then is coupled to the main armrest 100. This coupling of the holding tether 400 to the lateral side of the seat back S and the main armrest 100 provides the advantage that the first airbag chamber 120 is supported much more.

On the other hand, as illustrated in FIG. 5, the safety device for a vehicle according to the present disclosure further includes a fourth airbag chamber 145 that extends protrusively from a part of a front portion of the first airbag chamber 120, which is positioned below the second airbag chamber 140, toward a chest region of the vehicle occupant. The fourth airbag chamber 145 is positioned between a lower end of the second airbag chamber 140 and an upper end of the front-body abdominal chamber 220 and prevents or inhibits the arm or shoulder of the vehicle occupant from moving in the forward direction. This providing of the fourth airbag chamber 145 eliminates the problem that the arm or shoulder of the vehicle occupant is hurt by moving in the forward direction and thus coming into physical collision with any other object.

Then, as illustrated in FIG. 5, the safety device for a vehicle according to the present disclosure further includes a fifth airbag chamber 225 that extends from a rear portion of the front-body abdominal chamber 220 toward the pelvic region of the vehicle occupant. The fifth airbag chamber 225 expands between the main armrest 100 and the pelvic region of the vehicle occupant. In a case where the vehicle makes a side-collision, when the pelvic region of the vehicle occupant collides with the main armrest 100, there is a likelihood that the vehicle occupant will suffer an injury such as a bone fracture. In order to protect the vehicle occupant reliably, the fifth airbag chamber 225 is provided between the main armrest 100 and the vehicle occupant.

In addition, as illustrated in FIG. 6, the safety device for a vehicle according to the present disclosure further includes a sixth airbag chamber 230 that extends upward from an upper surface portion of the front-body abdominal chamber 220 and holds the front body of the vehicle occupant in place. Specifically, sixth airbag chambers 230 in a pair are provided on the left and right sides, respectively, of the seat. The sixth airbag chamber 230 that is provided on one of the left and right sides may extend upward to have an area that is larger than that of the sixth airbag chamber 230 that is provided on the other one. This providing of the sixth airbag chamber 230 enables the head of the vehicle occupant to be supported on the sixth airbag chamber 230 when the vehicle has a collision. Thus, a neck injury such as a neck-bone fracture may be prevented. Then, when triggered to expand, the sixth airbag chamber 230 that is provided on one of the left and right sides is positioned closer to the vehicle occupant than the sixth airbag chamber 230 that is provided on the other one. In a state where the expansion is completed, a front surface portion of the sixth airbag chamber 230 that is provided on one of the left and right sides is supported by the sixth airbag chamber 230 that is provided on the other one. The supporting of the sixth airbag chamber 230 provided on one of the left and right sides by the sixth airbag chamber 230 provided on the other one provides the advantage that strong support is further secured.

On the other hand, as illustrated in FIG. 7, the auxiliary armrest 200 according to the present disclosure is coupled, with a rotation shaft T, to the front end portion of the main armrest 100. When the airbag expands, the auxiliary armrest 200 rotates from the front end portion of the main armrest 100 toward the center of the seat ("B1" in FIG. 7). Specifically, a rack that shares an axis with the rotation shaft T and a pinion that is coupled to the rack are coupled to one end of the rotation shaft T. When the vehicle has a collision, gunpowder that is mounted in the main armrest 100 explodes and the pinion is triggered to move in the forward direction. That is, the rack that is coupled to the pinion rotates and thus the rotation shaft T that shares the axis with the rack rotates. Accordingly, the auxiliary armrest 200 rotates.

In addition, as illustrated in FIG. 8, the auxiliary armrest 200 according to the present disclosure is accommodated into the main armrest 100, and, when the airbag expands, is slit to protrude in the same direction in which the main armrest 100 faces forward. Specifically, the auxiliary armrest 200, when slid to protrude, is guided by a guide G within the main armrest 100 and thus obliquely protrudes toward the center of the seat ("B2" in FIG. 8).

Although the present disclosure has been described in conjunction with the preferred aspects which illustrate the technical spirit of the present disclosure, it will be apparent to those skilled in the art that the present disclosure is not limited only to the illustrated and described configurations and operations themselves but variations and modifications are possible without departing from the scope of the spirit of the disclosure. Accordingly, all of appropriate variations, modifications and equivalents are considered to pertain to the scope of the present disclosure.

What is claimed is:

1. A safety device for a vehicle, the safety device comprising:
   a main armrest;
   an auxiliary armrest that obliquely extends from a front end portion of the main armrest toward a center of a seat;
   a lateral-body chamber that is mounted in the main armrest and that, when triggered to expand, expands upward along a lateral body of a vehicle occupant and thus laterally holds the lateral body of the vehicle occupant in place;
   a front-body abdominal chamber that is mounted in the auxiliary armrest and that, when triggered to expand, expands toward an abdomen of the vehicle occupant and thus holds a front body of the vehicle occupant in place,
   wherein the lateral-body chamber is configured to include:
      a first airbag chamber that is mounted in the main armrest and that, when triggered to expand, expands upward along the lateral body of the vehicle occupant and thus laterally holds an arm of the vehicle occupant in place, and
      a second airbag chamber that extends protrusively from an upper end portion of the first airbag chamber toward a neck of the vehicle occupant and thus holds a shoulder of the vehicle occupant in place; and
   a third airbag chamber that extends protrusively from a part of a front portion of the first airbag chamber, which is positioned below the second airbag chamber, toward a chest region of the vehicle occupant,
   wherein the third airbag chamber is positioned between a lower end of the second airbag chamber and an upper end of the front-body abdominal chamber and prevents or inhibits the arm or shoulder of the vehicle occupant from moving in a forward direction.

2. The safety device for a vehicle, of claim 1, wherein the first airbag chamber and the second airbag chamber are spatially separated from each other by an inner panel that traverses an inside of one airbag chamber,
   wherein a through-hole through which gas flows between the first airbag chamber and the second airbag chamber is formed in the inner panel, and
   wherein the first airbag chamber is supplied with gas from an inflator of the main armrest and thus swells and the second airbag chamber is supplied with gas from the first airbag chamber through the through-hole and thus swells.

3. The safety device for a vehicle, of claim 1, further comprising:

an obliquely-positioned tether one end of which is coupled to an outside surface that faces the vehicle occupant, of the first airbag chamber and another end of which is coupled to an outside surface that faces the vehicle occupant, of the second airbag chamber, wherein, when expansion is in progress, the obliquely-positioned tether enables the second airbag chamber to maintain a state of expanding protrusively from the first airbag chamber.

4. The safety device for a vehicle, of claim 1, further comprising:

a holding tether, one end of which is coupled to a rear end portion of the first airbag chamber and the other end of which is coupled to a lateral side of a seat back, wherein, when the expansion is in progress, the holding tether prevents or inhibits the first airbag chamber from moving in a forward direction.

5. The safety device for a vehicle, of claim 4, wherein a holding tether cutter is provided on the holding tether, and wherein, in a case where a reclining angle of the seat back falls within a fixed range, when the first airbag chamber expands, the holding tether cutter cuts the holding tether.

6. The safety device for a vehicle, of claim 5, wherein the holding tether cutter is provided on the main armrest and is coupled to the other end of the holding tether.

7. The safety device for a vehicle, of claim 5, wherein one end of the holding tether is coupled to a rear end portion of the first airbag chamber and the other end extends along a lateral side of a back seat and then is coupled to the main armrest.

8. The safety device for a vehicle, of claim 1, further comprising:

a fourth airbag chamber that extends from a rear portion of the front-body abdominal chamber toward a pelvic region of the vehicle occupant wherein the fourth airbag chamber expands between the main armrest and the pelvic region of the vehicle occupant.

9. The safety device for a vehicle, of claim 8, further comprising:

at least one fifth airbag chamber that extends upward from an upper surface portion of the front-body abdominal chamber and holds the front body of the vehicle occupant in place.

10. The safety device for a vehicle, of claim 9, wherein the at least one fifth airbag chamber includes a pair of fifth airbag chambers provided on left and right sides, respectively, of the seat, and wherein one fifth airbag chamber of the pair of fifth airbag chambers that is provided on one of the left or right sides extends upward to have an area that is larger than that of the other fifth airbag chamber of the pair of fifth airbag chambers that is provided on the other one.

11. The safety device for a vehicle, of claim 10, wherein, when triggered to expand, among the pair of fifth airbag chambers, the one fifth airbag chamber that is provided on one of the left or right sides is positioned closer to the vehicle occupant than the other fifth airbag chamber that is provided on the other one, and wherein, in a state where the expansion is completed, a front surface portion of the fifth airbag chamber that is provided on one of the left or right sides is supported by the fifth airbag chamber that is provided on the other one.

12. The safety device for a vehicle, of claim 1, wherein the auxiliary armrest is coupled, with a rotation shaft, to the front end portion of the main armrest, and wherein, when an airbag expands, the auxiliary armrest rotates from the front end portion of the main armrest toward the center of the seat.

13. A safety device for a vehicle, the safety device comprising:

a main armrest;

an auxiliary armrest that is accommodated into the main armrest;

a lateral-body chamber that is mounted in the main armrest and that, when triggered to expand, expands upward along a lateral body of a vehicle occupant and thus laterally holds the lateral body of the vehicle occupant in place;

a front-body abdominal chamber that is mounted in the auxiliary armrest and that, when triggered to expand, expands toward an abdomen of the vehicle occupant and thus holds a front body of the vehicle occupant in place, wherein the lateral-body chamber is configured to include:

a first airbag chamber that is mounted in the main armrest and that, when triggered to expand, expands upward along the lateral body of the vehicle occupant and thus laterally holds an arm of the vehicle occupant in place, and a second airbag chamber that extends protrusively from an upper end portion of the first airbag chamber toward a neck of the vehicle occupant and thus holds a shoulder of the vehicle occupant in place; and a third airbag chamber that extends protrusively from a part of a front portion of the first airbag chamber, which is positioned below the second airbag chamber, toward a chest region of the vehicle occupant, wherein the third airbag chamber is positioned between a lower end of the second airbag chamber and an upper end of the front-body abdominal chamber and prevents or inhibits the arm or shoulder of the vehicle occupant from moving in a forward direction, and wherein when an airbag expands, the auxiliary armrest is slid to protrude in the same direction in which the main armrest faces forward.

14. The safety device for a vehicle, of claim 13, wherein when the auxiliary armrest is slid to protrude from the main armrest, the auxiliary armrest is guided by a guide within the main armrest and thus protrudes obliquely toward a center of a seat.

* * * * *